US012761099B2

(12) United States Patent
Cherian et al.

(10) Patent No.: US 12,761,099 B2
(45) Date of Patent: Oct. 13, 2026

(54) EMISSION DETECTION DEVICE WITH A FLOW PROFILE DESIGN THAT IMPROVES RESPONSE RATE AND SENSITIVITY

(71) Applicant: Honeywell International Inc., Charlotte, NC (US)

(72) Inventors: Jaison Cherian, Bengaluru (IN); Kiran Ambilpur, Hyderabad (IN); Ramesh Narkhede, Pune (IN); Purushottam Kulkarni, Nalagandla (IN); Saravanan Nagasundaram, Bengaluru (IN); Bas Kastelein, Hippolytushoef (NL)

(73) Assignee: Honeywell International Inc., Charlotte, NC (US)

( * ) Notice: Subject to any disclaimer, the term of this patent is extended or adjusted under 35 U.S.C. 154(b) by 416 days.

(21) Appl. No.: 18/119,015

(22) Filed: Mar. 8, 2023

(65) Prior Publication Data

US 2023/0375430 A1 Nov. 23, 2023

(51) Int. Cl.
*G01M 3/04* (2006.01)

(52) U.S. Cl.
CPC .................................... *G01M 3/04* (2013.01)

(58) Field of Classification Search
CPC .. G01N 27/4077; G01N 1/40; G01N 15/0205; G01N 15/1459; G01N 2001/4038; G01N 2015/0046; G01N 2015/1027; G01N 2021/8578; G01N 21/71; G01N 27/128; G01N 27/622; G01N 33/0014; G01N 33/0036; G01L 17/00; G01M 15/104; G01M 15/108; G08B 21/00; H01J 49/0031; H01J 49/062
See application file for complete search history.

(56) References Cited

U.S. PATENT DOCUMENTS

| | | | | |
|---|---|---|---|---|
| 5,353,744 | A | 10/1994 | Custer | |
| 6,332,111 | B1 * | 12/2001 | Fincke | G01F 1/88 702/50 |
| 9,488,628 | B2 * | 11/2016 | Boyd | G01N 27/4077 |
| 11,353,477 | B2 | 6/2022 | Murray et al. | |
| 2021/0372886 | A1 * | 12/2021 | Baars | G01M 15/108 |
| 2022/0063356 | A1 * | 3/2022 | Tanno | B60C 19/00 |

FOREIGN PATENT DOCUMENTS

GB 2441554 A 12/2008

OTHER PUBLICATIONS

Ultrasonic Anemometer 2D, from software version V3.09, Status: May 2009, Feingerätebau K. Fischer GmbH.

* cited by examiner

*Primary Examiner* — Kristina M Deherrera
*Assistant Examiner* — Gedeon M Kidanu
(74) *Attorney, Agent, or Firm* — Ingrassia Fisher & Lorenz

(57) ABSTRACT

A sensor having a converging shape (e.g., ellipsoidal) that causes a flow stream velocity to increase from the entry towards the center (narrowest region), in line to Bernoulli's principle. The sensor includes a trapped volume that can be used to detect gas molecules. The positioning of the sensor in a narrow region can expose it to higher velocity and higher ppm, which in turn lead to a better exchange of molecules between ambient and the void in front of a gas sensing element within the sensor, thereby improving the sensor's ability to detect gas molecules at lower concentrations and with a higher speed of response. The shape of the emission detection device allows for flow convergence regardless of the wind direction in 360°.

17 Claims, 8 Drawing Sheets

EMISSION DETECTION DEVICE WITH A FLOW PROFILE DESIGN THAT IMPROVES RESPONSE RATE AND SENSITIVITY

CROSS-REFERENCE TO RELATED PATENT APPLICATION

This patent application claim priority to Indian Provisional Patent Application No. 202211028940, filed May 19, 2022, which is incorporated herein by reference in its entirety.

TECHNICAL FIELD

Embodiments are generally related to the field of emission detection. Embodiments further relate to flow sensors and detection devices used to detect gas leakage in industrial environments.

BACKGROUND

May jurisdictions require strict controls on industrial greenhouse gas emissions, including combustion and fugitive emissions emanating from, for example, industrial plant equipment. While there is a greater quantity of combustion related emissions, fugitive emissions of uncombusted methane (and other chemical species) have a much greater global warming potential for a given mass of emission.

Today, operating companies with industrial facilities within the United States, United Kingdom, and other developed nations are required to provide an inventory of all plant equipment assets, such as valves, pumps, flanges, burners etc., which could potentially be a source of a fugitive emissions. Companies are also required to periodically monitor the gas concentrations near each asset to ensure there is no significant leak or remediate the issue if there is. This can be achieved manually with a person using a hand-held leak detection device, as defined by the applicable standards. This approach is impractical and inefficient, however, because it is very time consuming and hence expensive. At large sites up to twenty-five technicians, for example, may be employed full time to monitor all the equipment assets. Furthermore, the individual assets are only monitored infrequently (e.g., once a quarter or once a year) because of the large number of assets (e.g., 250,000 assets for a mid-sized refinery).

Other problems inherent with current industrial sensors used in monitoring industrial greenhouse gas emissions include an insufficient ability to detect gas leakage at any wind speed, and the lack of 360 degree gas leak detection. Furthermore, conventional sensors/detectors are not readily portable and are difficult to install with wireless long range communications capabilities.

With respect to the wind speed problem noted above, conventional gas sensors utilized in industrial applications lack an aerodynamic shape to optimize sensitivity and speed of response. FIG. 1, for example, illustrates images of conventional industrial gas sensors/detectors 12, 14, 16, and 18. The various sensors/detectors 12, 14, 16, and 18 depicted in FIG. 1, are shown as facing down to prevent ingress of dust and water, but these sensors clearly do not have an aerodynamic design that may be used to optimize sensitivity and speed of response.

Some ultrasonic anemometers, for example, have aerodynamic designs, but not these designs and shapes are not sufficient nor used for gas detection optimization. FIG. 2, for example, illustrates typical 2D ultrasonic anemometer shapes for sensors 22, 24, and 26. These devices, however, are not well suited for the task of industrial greenhouse gas emission detection.

BRIEF SUMMARY

The following summary is provided to facilitate an understanding of some of the features of the disclosed embodiments and is not intended to be a full description. A full appreciation of the various aspects of the embodiments disclosed herein can be gained by taking the specification, claims, drawings, and abstract as a whole.

It is, therefore, one aspect of the embodiments to provide for an emission detection device that can detect gas leaks at any wind speed.

It is another aspect of the embodiments to provide for an emission detection device that provides for 360 degree gas leak detection.

It is a further aspect of the embodiments to provide for an emission detection device that is easy to install in industrial facilities and functions well with devices having wireless long range communication capabilities.

It is also an aspect of the embodiments to provide for a portable emission detection device that is battery-operated and includes AI (Artificial Intelligence) capabilities for gas leak location detection.

The aforementioned aspects and other objectives can now be achieved as described herein. An emission detection device can be implemented, which can include a sensor having a converging shape (e.g., ellipsoidal) that causes a flow stream velocity to increase from the entry towards the center (narrowest region), in line to Bernoulli's principle. The sensor can include a trapped volume that it uses to detect gas molecules. The positioning of the sensor in the narrow region of the emission detection device can expose it to higher velocity and higher ppm, which in turn lead to a better exchange of molecules between ambient and the void in front of a gas sensing element inside the sensor, thereby improving the sensor's ability to detect gas molecules at lower concentrations and with a higher speed of response.

The shape of the emission detection device allows for flow convergence regardless of the wind direction in 360°. This aerodynamic shape of the emission detection device can be implemented in other geometric forms; however, the placement of a gas sensor at the converging section can cause a decrease in the fluid's static pressure by Bernoulli's principle making it a unique feature in this application.

This design can be further extended to the emissions sensing in the gas meters. In some embodiments with a gas sensor facing down and mounted in the top part of the diabolo, the design of emission detection device can improve the vertical velocity of the gas molecules towards the sensing element inside a void in the gas sensor, thereby improving its responsiveness.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIG. 10A and FIG. 12B illustrate respective front and back views of a sensor, in accordance with an embodiment.

Like reference symbols or reference numerals in the various drawings indicate like elements.

DETAILED DESCRIPTION

Figure 1:
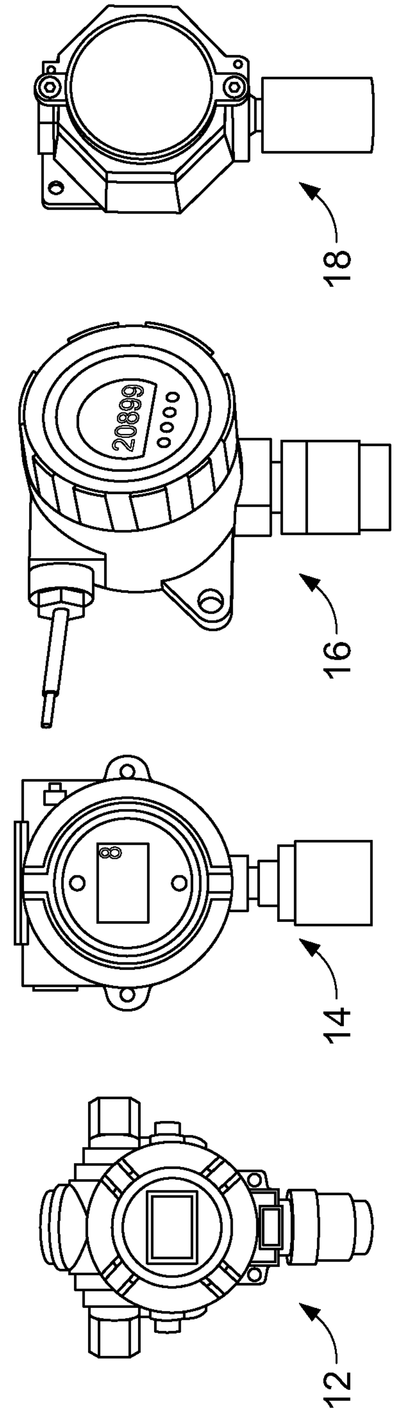
FIG. 1 illustrates images of various prior art gas detectors that have been used in industrial applications and which lack aerodynamic shapes sufficient for optimizing sensitivity and speed of response.
Figure 2:
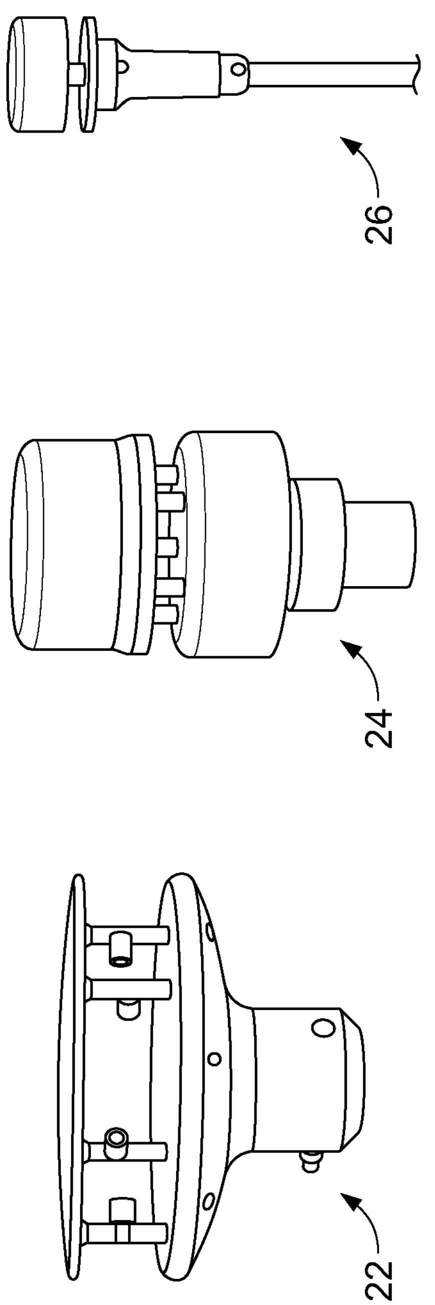
FIG. 2 illustrates example images of prior art 2D ultrasonic anemometer shapes that have been used in industrial applications.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other issues, subject matter may be embodied as methods, devices, components, or systems. Accordingly, embodiments may, for example, take the form of hardware, software, firmware, or a combination thereof. The following detailed description is, therefore, not intended to be interpreted in a limiting sense.

Throughout the specification and claims, terms may have nuanced meanings suggested or implied in context beyond an explicitly stated meaning. Likewise, phrases such as "in an embodiment" or "in one embodiment" or "in an example embodiment" and variations thereof as utilized herein may or may not necessarily refer to the same embodiment. Similarly, the phrase "in another embodiment" or "in another example embodiment" and variations thereof as utilized herein may or may not necessarily refer to a different embodiment. It is intended, for example, that claimed subject matter may include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Generally, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The embodiments can be implemented to solve the problems identified in the background section by using multiple independent gas detection sensors, which can be geographically distributed around a site facility, and one or more weather stations that can monitor wind speed and direction. Data from these sensors can be collected wirelessly via a gateway, stored in an 'Historian' and combined in an Analysis workflow to triangulate an estimate of the leak location and provide an estimate of the leak size, which can enable an operating company, for example, to focus on the most important leaks in a timely way.

The embodiments can operate based on a principle of using wind to let gas molecules propagate to a gas detector and triangulate back to position of the leak. Gas detectors used as emission monitoring detector need to be very sensitive and should have a short response time, as explained below.

Sensitivity to detect low concentrations of gas well below 100 ppm is important in order to be able to detect small leaks with a reasonable distance or mesh size between detectors, as the concentration in the gas plume will quickly reduce with distance and with wind speed. In contrast, typical Methane gas detectors in industry are used as safety devices, to reliably detect an Alarm level of gas concentration close to the Lower Explosion Limit and are equipped with filters to ignore small or incidental gas concentrations to avoid false alarms.

A short response time to detect gas molecules is important because the wind is very changeable and the gas plume originating from the leak may only hit the detector during a short time interval of 15 seconds. If the detector is not capable of detecting such short events, its use as Emission Monitor detector is void.

The embodiments can provide a unique aerodynamic shape that can improve the sensitivity and response time of the gas detector, with a 360° detection view, and can be further optimized for gas plumes that are not propagating fully horizontal, which happens at low- and variable wind speeds.

Gas meters utilized in industry do not provide any optimized aerodynamic design to improve the performance. A typical conventional gas meter may include a measurement body with a sensor extending outward at or from the bottom, and a sensor facing downward to reduce water/dust ingress.

Note that although the application area of the embodiment may be explained in the context of methane detection, it can be appreciated that the embodiments can be expanded to any application for continuous gas leak detection for any gas type. It should also be appreciated that the various and specific parameters and values discussed herein are presented for illustrative and exemplary purposes only and should not be considered limiting features of the embodiments.

As will be discussed in greater detail herein, the embodiments may be implemented to detect a gas leak at any wind speed. In some implementations, the embodiments may provide for 360° gas leak detection, and the detection of buoyant gases in air at lower wind speeds. Furthermore, the embodiments may be implemented as portable and easy to install sensor devices with wireless long range communication capabilities, and in some cases, as devices having battery operated or energy harvesting features with artificial intelligence (AI) capabilities for gas leak location detection. In some cases, the embodiments may include sensor ingress water/dust protection and can be implemented as gas sensors of any make and type.

The embodiments preferably include an aerodynamic design for the gas detector device that can allow for the detection of the gas in 360° direction, at lowest gas concentrations and at a wide range of wind speeds. The design of at least some of the embodiments has already been carefully developed using multiple computational fluid dynamics (CFD) analysis and field trials.

The aerodynamic shape of the embodiments can optimize, over a range of wind velocities, the vertical velocity of the gas molecules towards the gas sensor and the concentration of gas molecules in front of the sensor. This can provide for an improved sensitivity and response time, which are essential for detecting short gas events.

The next section of this disclosure discusses and illustrates mechanical details of a field device that can detect gas emissions, in accordance with one or more embodiments. These mechanical details are independent of gas detection sensor and technology.

Figure 3:
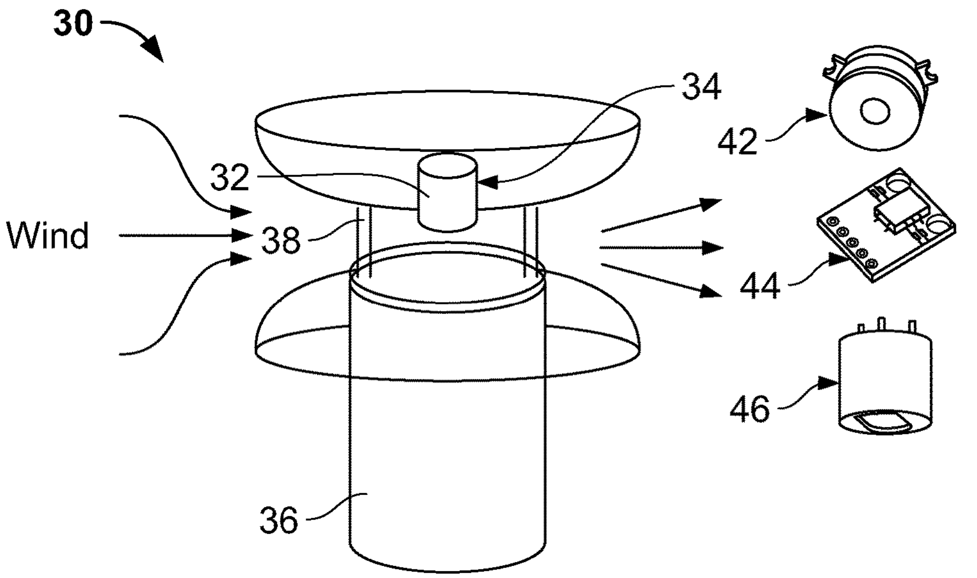
FIG. 3 illustrates a schematic diagram of an aerodynamic design for a gas sensor, in accordance with an embodiment.

FIG. 3 illustrates a schematic diagram of an aerodynamic design for a gas sensor device 30 (e.g., a field device), in accordance with an embodiment. The gas sensor device 30 can include a gas sensor 32, which can be mounted vertically to prevent gas/dust ingress. A "diabolo" mechanical form-factor (also referred to simply as "diabolo") can be applied to the sensor configuration shown in FIG. 3, to increase wind speed and gas concentration at the gas sensor 32. The gas sensor 32 depicted in FIG. 3 can be mounted in the upper half of the diabolo device 30 (i.e., sensor device 30) and is shown as facing down, to prevent water ingress and dust ingress, as noted above, which is good practice in industry. The upper half of the diabolo device 30 can thus provide water/dust ingress protection.

Figure 4:
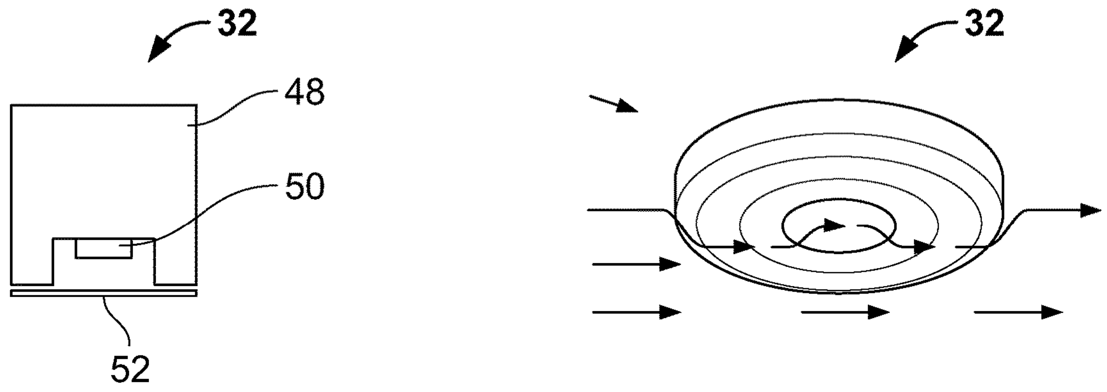
FIG. 4 illustrates a schematic diagram of a gas sensor at the left side of FIG. 4 including a gas sensor enclosure, and a gas sensor chip in a small void, and an image depicting an improved vertical image of gas sensor molecules into the sensor void, in accordance with an embodiment.

The ellipsoidal shape of the diabolo top and -bottom part (or more broadly stated the converging shape of the top- and bottom part) and the small gap between them can accelerate the movement of the air/gas molecules and also increase the vertical speed of the molecules into the gas sensor void where the gas sensing element is located (e.g., see FIG. 4). The gas sensor 32 can also be disposed in a modular device 34 in the context of a modular design that allows for a fit with different gas sensors and configurations. Examples of such different gas sensors and configurations FIG. 4 illustrates a schematic diagram of the gas sensor 32, in accordance with an embodiment. The gas sensor 32 is depicted at the left side of FIG. 4. The gas sensor 32 can include a gas sensor enclosure 48, and a gas sensor chip 50 located in a small void. One or more protective layer(s) 52 can be provided for explosion, dust, and water ingress protection.

FIG. 4 also depicts an image of the gas sensor 32 (right side of FIG. 4) illustrating gas sensor molecules into the sensor void, in accordance with an embodiment. FIG. 4 demonstrates that the gas sensing element (chip 50) of the gas sensor 32 can be mounted in a small void shielded by one or more filters from the environment. The gas molecules can pass this filter with some delay. The image shown at the right hand side of FIG. 4 depicts improved air flow in front of the gas sensor 32.

Figure 5:
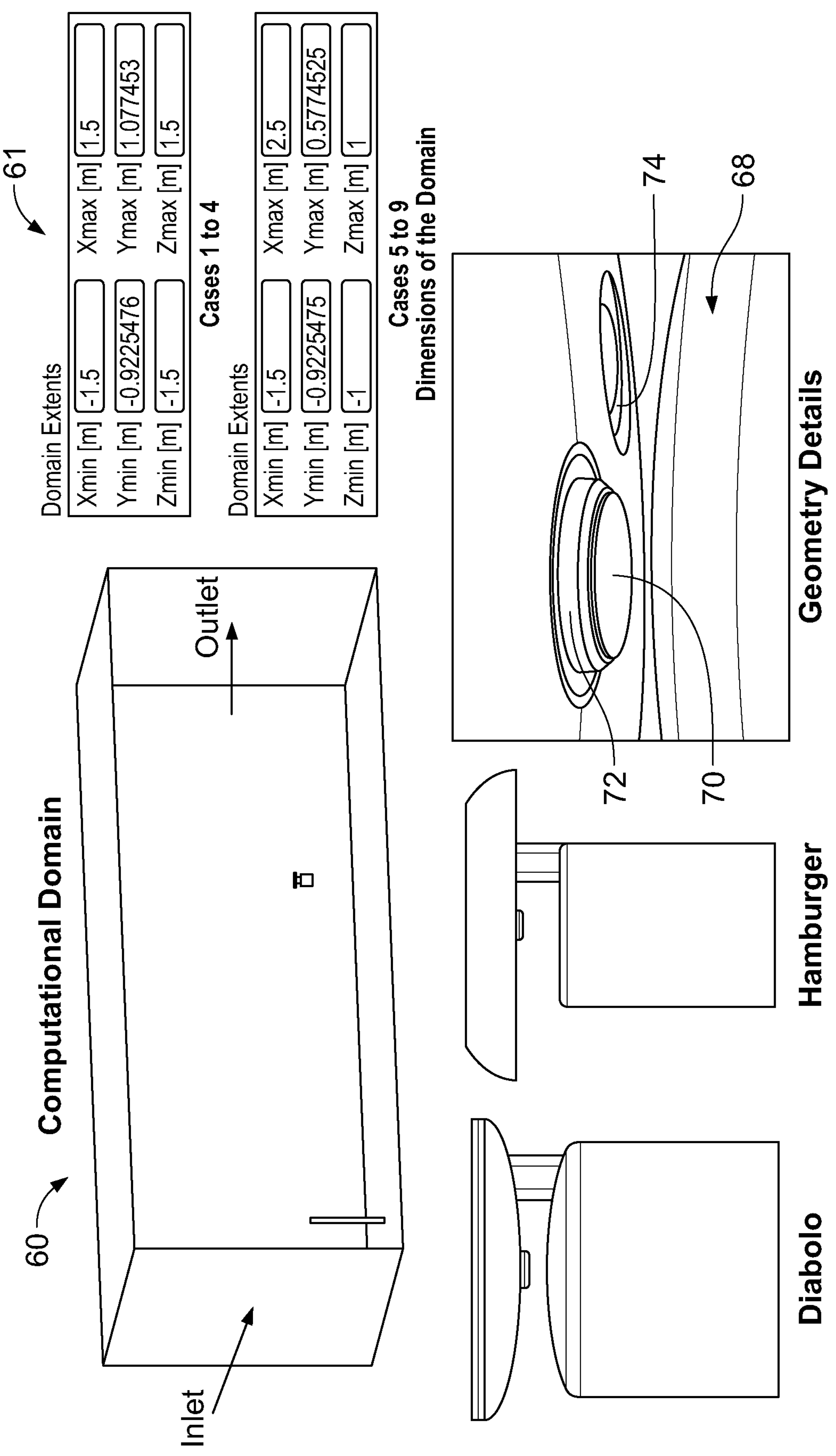
FIG. 5 illustrates CFD simulation details and data thereof comparing the Diabolo design to a Hamburger design, without converging shape for various leak sizes and wind speeds, in accordance with an embodiment.

FIG. 5 illustrates CFD simulation details and data thereof comparing the Diabolo design 65 discussed above to a so-called hamburger design 66, without converging shape for various leak sizes and wind speeds, in accordance with an embodiment. It should be appreciated that such simulation details (along with all other simulation details and results presented herein) are included for illustrative and exemplary purposes only and are not limiting features of the embodiments.

The CFD simulation details shown in FIG. 5 are based on assumptions that the wind direction is aligned/parallel to the sensor location/direction (e.g., positive X-direction), and that leakage is crossing/passing through the sensor location. A computational domain 60 is shown in FIG. 5 with respect to dimensions of the domain, as shown in table 61 with respect to Cases 1 to 4 and Cases 5 to 9. Geometry details 68 are also shown in FIG. 5 including a filter 70, a sensor 72 and a vent port 74.

Figure 6:
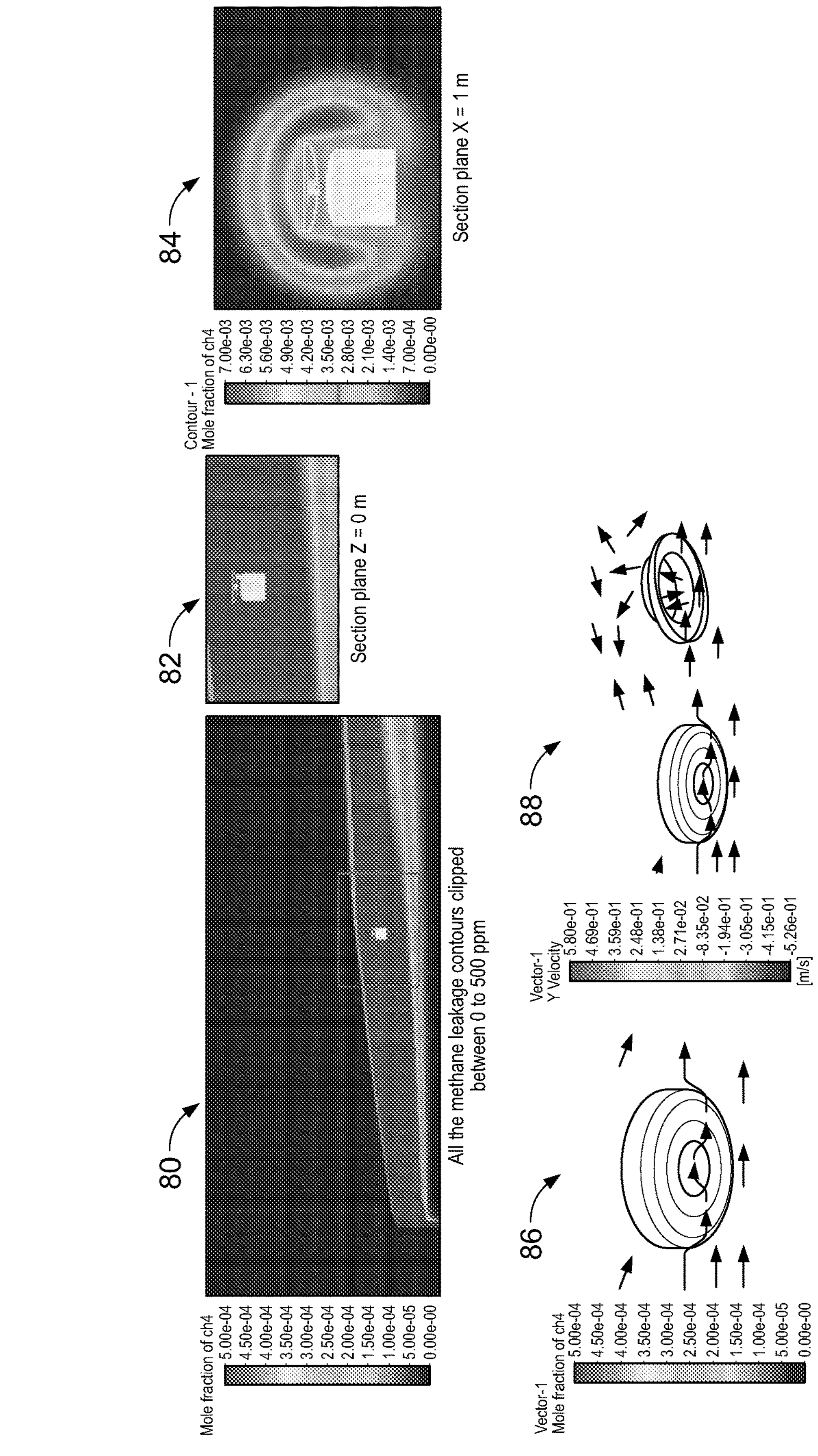
FIG. 6 illustrates simulation results for wind speed 0.2 m/s and leak rate 227 liter/hour, in accordance with an embodiment.

FIG. 6 illustrates example simulation results for wind speed 0.2 m/s and leak rate 227 liter/hour, in accordance with an embodiment. The example results are shown in graph 80 association with a z-plane section 82 and an x-plane section 84. Graph 80 illustrates all methane leakage contours clipped between 0 to 500 ppm. Graphs 86 and 88 show additional simulation results in the form of a vector contour and a velocity vector contour, respectively. From the section contours shown at the top of FIG. 6 with respect to graphs 80, 82 and 84, it is evident the flow passes through the sensor location. The velocity contour indicates that for 0.5 m/s wind velocity, flow recirculation can occur within the sensor sensing region. The velocity vector contour (graph 88) demonstrates for 0.5 m/s, wind velocity, the flow is entering the vent port.

Figure 7:
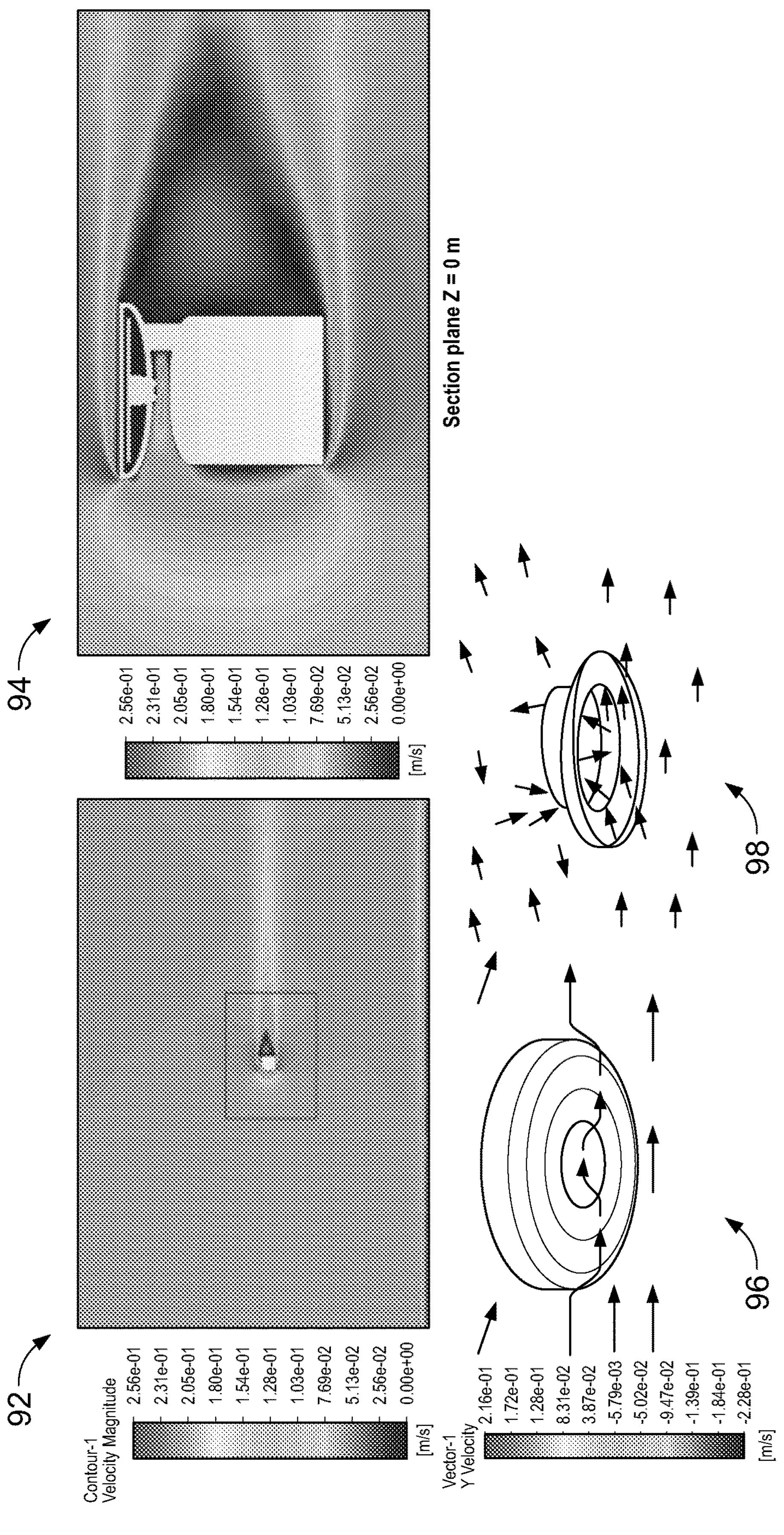
FIG. 7 illustrates simulation results showing flow circulation at the gas sensing element, in accordance with an embodiment.

FIG. 7 illustrates simulation results showing flow circulation at the gas sensing element, in accordance with an embodiment. These simulation results are shown in FIG. 7 with respect to graph 92 (contour-1, velocity magnitude), graph 94 (section plane z=0 m), graph 95 (vector 1, y velocity) and graph 98 (velocity vector contour). From the velocity contours shown in FIG. 7 with respect to graphs 92 and 94, it is evident that the flow is passing through sensor location. The velocity vector contour indicates that for 0.2 m/s wind velocity, flow recirculation occurs within the sensor sensing region. Furthermore, the velocity vector contour demonstrates that for 0.2 m/s wind velocity, flow is entering through the vent port.

Figure 8:
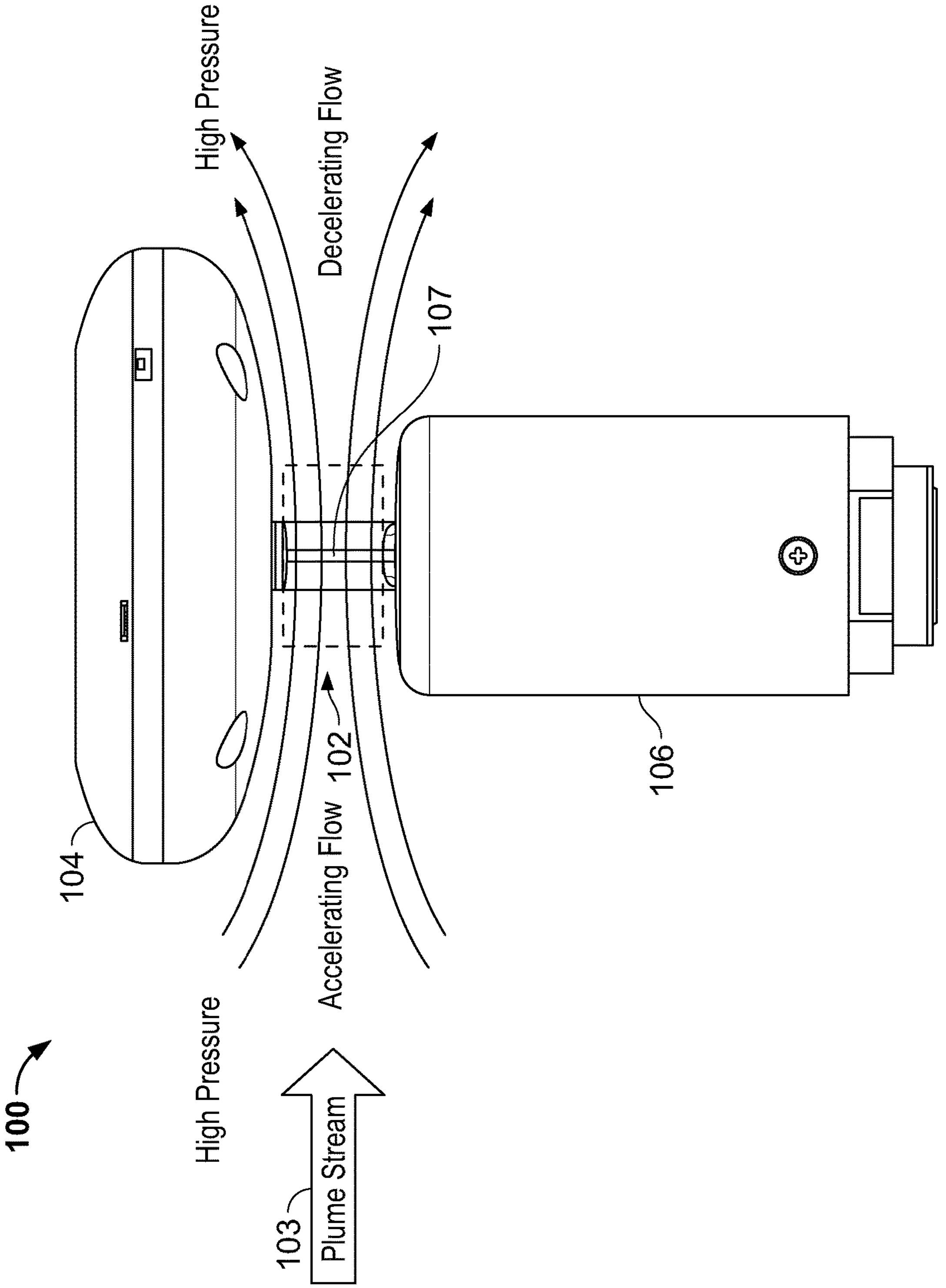
FIG. 8 illustrates a schematic diagram of the disclosed detector with bottom diabolo reduced in size to capture upwards plume (due to buoyancy effect at low wind speeds), in accordance with an embodiment.

FIG. 8 illustrates a schematic diagram of a sensor 100 (e.g., a field device) having a bottom 'diabolo' configuration reduced in size to capture upwards plume (due to buoyancy effect at low wind speeds), in accordance with an embodiment. The sensor 100 may function as a flow sensor and can be configured to include a cylindrically shaped bottom portion 106 and an upper portion 104. A throat section 102 is located between the upper portion 104 and the lower portion 106. A high velocity, low-pressure region 107 is located centrally within the throat section 102. Flow accelerates at the throat section 102 due to reduction in the area (i.e., Bernoulli's principle). High pressure is also noted in FIG. 8 along with accelerating flow and decelerating flow with respect to a plume stream 103.

Figure 9:
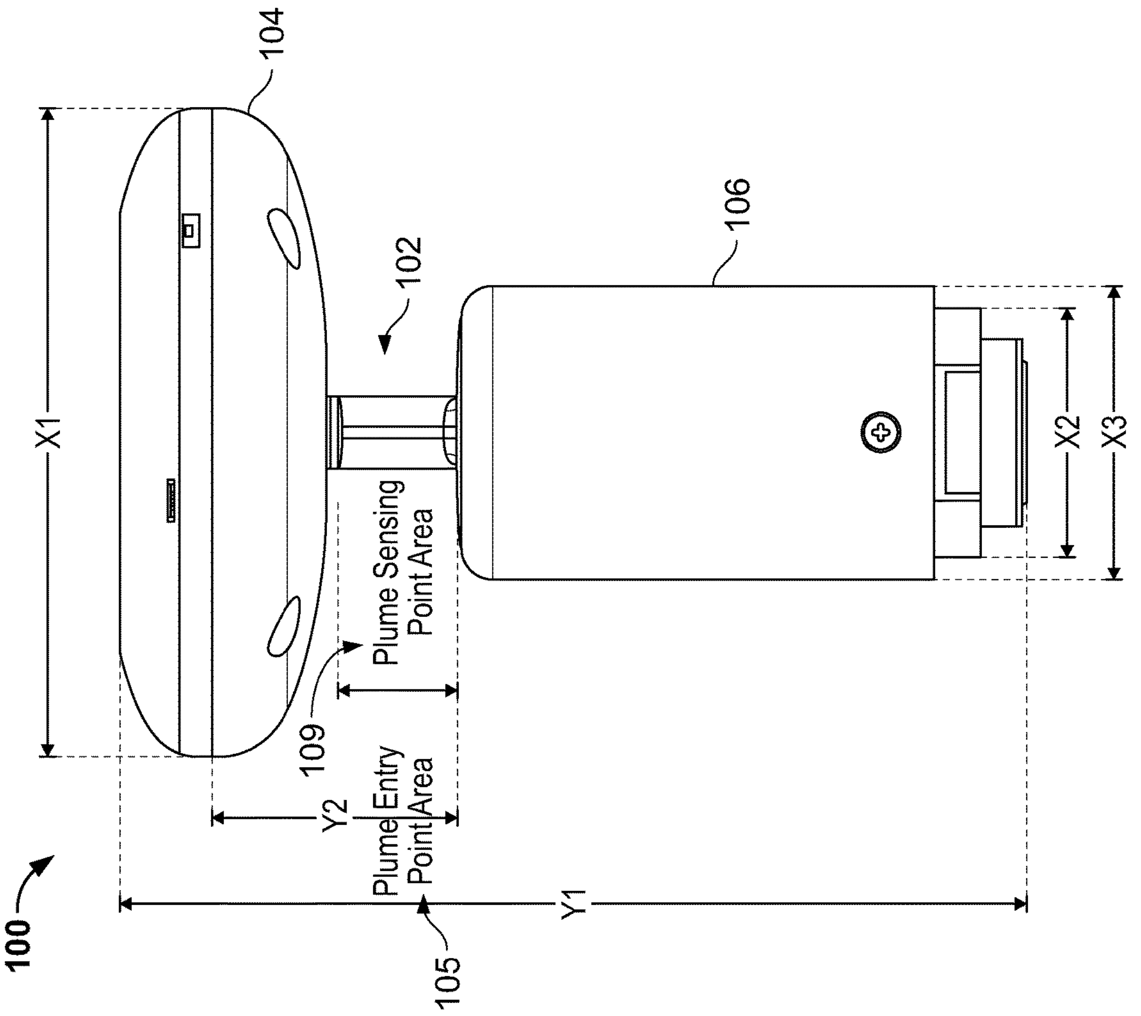
FIG. 9 illustrates non-limiting and example embodiments of the Diabolo model, in accordance with an embodiment.

FIG. 9 illustrates a non-limiting and example embodiment of the 'diablo' model in the form of sensor 100, in accordance with an embodiment. Note that from the Mass conversation equation, ρAV=constant, ρ=Fluid Density, A=Area of flow section, and V=Fluid Velocity. For low-speed flows (incompressible), density remains constant, so the equation deduces to AV=constant. Thus, FIG. 9 depicts a plume point entry area 105 and a plume sensing point area with respect to the upper portion 104 and the lower portion 106.

The area and velocity are inversely proportional to each other, from the dimensions of the sensor 100. Area is reduced approximately by 50% at the sensing location with respect to the plume entry location 105, which can be optimized using CFD simulations, which can increase velocity at the sensor location, which is twice the entry point i.e., $V_{Sensing\ Point}=2V_{Entry\ point}$. This increased velocity can push more gas towards the sensing location (sensitivity), and travel faster (response time). These are effects of the 360° diabolo design of sensor 100.

Figure 10B:
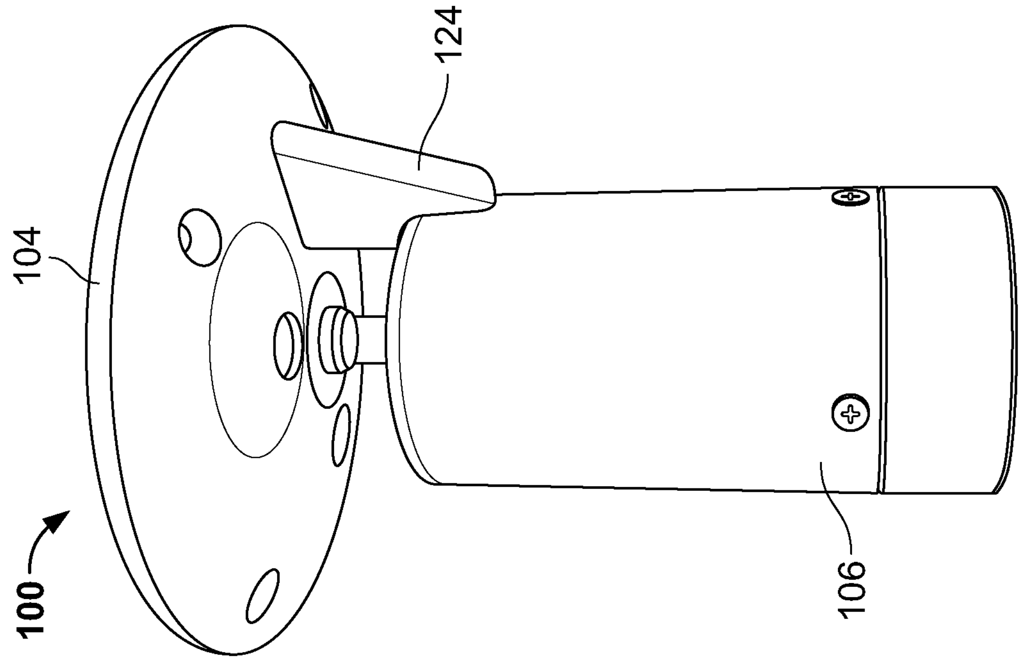
Figure 10A:
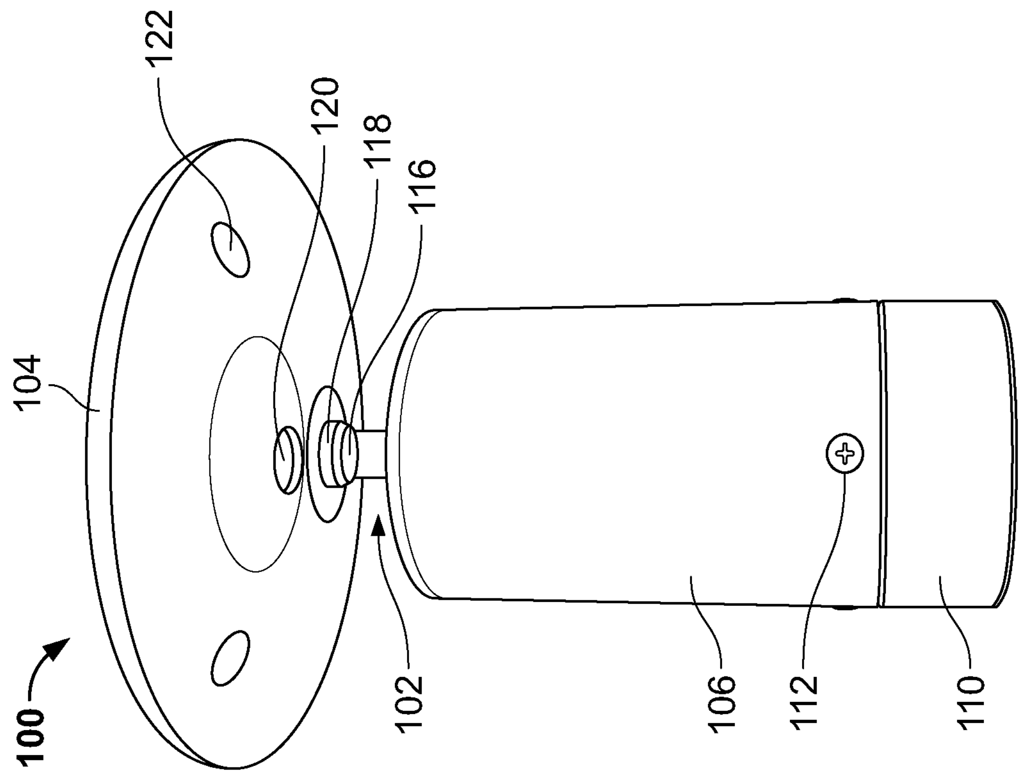

FIG. 10A and FIG. 12B illustrate respective front and back views of the sensor 100 (e.g., an emission detection device), in accordance with an embodiment. The sensor shown 100 in FIG. 10A can include one or more screws 122, a PTFE filter 120, a sensor holder 118, a sensor 118, and another PTFE filter 116. The sensor 118 is located in the throat section 102. The sensor 100 further includes one or more screws 112 and a mounting connector 110. These features are generally depicted in FIG. 10A, while FIG. 10B shows a wiring column 124 of the sensor 100.

The embodiments depict a design (can be referred to as a "Diabolo" design) that includes a converging shape (e.g., ellipsoidal). This converging shape can cause the flow stream velocity to increase from the entry towards the center (narrowest region), in line to Bernoulli's principle. The sensor/detector has a trapped volume that it can use to detect the gas molecules. The positioning of the sensor in the narrow region of the Diabolo device (e.g., sensor 100) exposes it to higher velocity and higher ppm which in turn can lead to a better exchange of molecules between ambient and the void in front of the gas sensing element inside the gas sensor, thereby improving the sensor's ability to detect the gas molecules at lower concentrations and with a higher speed of response.

The Diabolo shape allows for flow convergence regardless of the wind direction in 360°. The aerodynamic shape can be implemented in other geometric forms; however, the placement of a gas sensor at the converging section causes a decrease in the fluid's static pressure by Bernoulli's principle making it a unique feature of the embodiments. This design can be further extended to the emissions sensing in the gas meters. With a gas sensor facing down and mounted in the top part of the diabolo, the diabolo design can improve the vertical velocity of the gas molecules towards the sensing element inside a void in the gas sensor, thereby improving its responsiveness.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A sensor device, comprising an upper portion and a lower portion spaced apart from each other to define a throat section therebetween, wherein the upper portion and the lower portion have a converging shape, wherein the converging shape is configured to cause a velocity of a flow stream to increase in the throat section in comparison to the velocity of the flow stream outside the throat section; and a sensor enclosure mounted within the upper portion in the throat section, wherein the upper portion defines a first void that is configured to receive the sensor enclosure, wherein the sensor enclosure defines a second void that is configured to receive a gas sensing element, wherein the gas sensing element is configured to detect a plurality of gas molecules present in the flow stream in the throat section, wherein the increased velocity of the flow stream in the throat section facilitates an increase in reception of the plurality of gas molecules in the second void.

2. The sensor of claim 1 wherein the gas sensing element is configured to detect the plurality of gas molecules at low concentrations.

3. The sensor of claim 1 wherein the gas sensing element is configured to detect the plurality of gas molecules with a high response speed.

4. The sensor of claim 1 wherein the gas sensing element is configured to detect the plurality of gas molecules at low concentrations and with a high response speed.

5. The sensor of claim 1 wherein the converging shape of the upper portion and the lower portion is configured to facilitate the flow stream in converging regardless of wind direction in 360°.

6. The sensor of claim 1 wherein the gas sensing element is located in the throat section with respect to at least two filters.

7. An emission detection device, comprising:

an upper portion and a lower portion spaced apart from each other to define a throat section therebetween, wherein the upper portion and the lower portion have a converging shape, wherein the converging shape is configured to cause a velocity of a flow stream to increase in the throat section in comparison to the velocity of the flow stream outside the throat section; and a sensor enclosure mounted within the upper portion in the throat section, wherein the upper portion defines a first void that is configured to receive the sensor enclosure, wherein the sensor enclosure defines a second void that is configured to receive a gas sensing element, wherein the gas sensing element is configured to detect a plurality of gas molecules present in the flow stream in the throat section, wherein the increased velocity of the flow stream in the throat section facilitates increase in reception of the plurality of gas molecules in the second void.

8. The emission detection device of claim 7 wherein the converging shape facilitates a flow convergence regardless of wind direction in 360°.

9. A method of operating a sensor, comprising detecting a plurality of gas molecules using a trapped volume in the sensor, wherein a sensor enclosure is mounted within an upper portion in a throat section, wherein the upper portion of an emission detection device defines a first void configured to receive the sensor enclosure, wherein the sensor enclosure defines a second void configured to receive the sensor, wherein the emission detection device comprises the upper portion and a lower portion spaced apart from each other to define the throat section therebetween, wherein the upper portion and the lower portion together have a converging shape, wherein the converging shape causes a velocity of a flow stream to increase towards a center of the upper portion and the lower portion.

10. The method of claim 9 further comprising:

facilitating an exchange between the plurality of gas molecules in a throat section and the second void in front of a gas sensing element within the sensor by exposing the center to a higher velocity and a higher ppm through a positioning of the center of the sensor.

11. The method of claim 9 wherein the gas sensing element within the sensor detects the plurality of gas molecules at low concentrations.

12. The method of claim 11 wherein the gas sensing element detects a gas with a high response speed.

13. The method of claim 11 wherein the gas sensing element detects the plurality of gas molecules at low concentrations and with a high response speed.

14. The method of claim 9 wherein the converging shape facilitates a flow convergence regardless of wind direction in 360°.

15. The method of claim 9 wherein the gas sensing element is located within the throat section.

16. The method of claim 15 wherein the gas sensing element is located in the throat section with respect to at least two filters.

17. The method of claim 9 wherein the converging shape facilitates a flow convergence regardless of wind direction.

* * * * *